United States Patent Office 3,524,778
Patented Aug. 18, 1970

3,524,778
MANUFACTURE OF PLASTICIZER-CONTAIN-
ING MAT-SURFACE POLYVINYL BUTYR-
ALDEHYDE SHEET MATERIAL DIRECTLY
USABLE IN THE MANUFACTURE OF LAMI-
NATED SAFETY GLASS
Wolfgang Jensch, Troisdorf, Hans-Georg Gröblinghoff, Oberlar, and Rolf Beckmann, Siegburg, Germany, assignors to Dynamit Nobel Aktiengesellschaft, Troisdorf, Germany, a corporation of Germany
No Drawing. Filed Feb. 29, 1968, Ser. No. 709,221
Claims priority, application Germany, Mar. 2, 1967,
D 52,415
Int. Cl. B65h 81/00
U.S. Cl. 156—184          5 Claims

ABSTRACT OF THE DISCLOSURE

Process for manufacturing plasticizer-containing mat-surface polyvinyl butyraldehyde sheet materials for direct use in the manufacture of laminated safety glass comprising applying a polyolefin foil separating sheet onto a mat-surface polyvinyl butyraldehyde sheet having the required content of moisture, thereafter winding the same into a roll and storing the rolls under conditions ensuring the absence of air and water.

This invention relates to a process for the manufacture of plasticizer-containing mat-surface polyvinyl butyraldehyde sheet material suitable for direct use in the manufacture of laminated safety glass.

Polyvinyl butyraldehyde sheet materials containing plasticizers and manufactured for use in the manufacture of laminated safety glass are characterized by a very high degree of stickiness. In order to prevent such material from sticking to itself when the same is wound in rolls, the surfaces thereof are sprinkled over with sodium bicarbonate powder, the same serving as a parting agent. Before the material is used, however, this sodium bicarbonate has to be removed by washing with water. Large manufacturers of laminated safety glass use automatic washing machines for this purpose. These machines are themselves very costly and further are expensive to operate. Even so, a considerable amount of the sheet material and the laminated product are rejected due to contamination of the polyvinyl butyraldehyde material resulting from the failure to remove the sodium bicarbonate completely.

Another and even greater disadvantage of washing the material before its use in the manufacture of the laminated glass is the fact that water absorption by the polyvinyl butyraldehyde sheet material in the washing process varies according to the prevailing conditions. Particularly in the manufacture of laminated safety glass for automotive windshields, only polyvinyl butyraldehyde sheet materials having a precisely defined moisture content can be used, in order to meet the extremely strict requirements as regards mechanical impact strength. Polyvinyl butyraldehyde sheet materials having a moisture content that differs appreciably from the optimum value result in the production of laminated safety glass whose resistance to impact is sometimes less than half that of safety glass made on the basis of material having the optimum value. The impact resistance as concerned here is measured by the maximum height from which a weight can be dropped, which is, as a rule, a 10-kilogram weight, without breaking through the glass. The weight is shaped in the form of the head and shoulders of a human being and is called a "phantom."

The adjustment of the polyvinyl butyraldehyde sheets to the optimum moisture content is carried out after the washing process by storing the sheets for a number of hours in rooms of controlled air temperature and relative humidity. For this purpose, however, the laminated safety glass manufacturers require expensive air conditioning equipment.

An object of the present invention is a process for the manufacture of plasticizer-containing, mat-surface polyvinyl butyraldehyde sheet materials which can be used directly in the manufacture of laminated safety glass.

A further object of the invention is such a process which is simple and economical in operation.

Still another object of the present invention is a process for the manufacture of plasticizer-containing, mat-surface polyvinyl butyraldehyde sheet materials having the desired moisture content and being directly useable in the manufacture of laminated safety glass.

These and other objects of the invention will be apparent from a consideration of the following disclosure.

In accordance with the invention, the above and other objects are obtained in a process for the manufacture of plasticizer-containing, mat-surface polyvinyl butyraldehyde sheet materials directly useable in the manufacture of laminated safety glass comprising applying a polyolefin foil separating sheet material onto a sheet of polyvinyl butyraldehyde having the desired moisture content, thereafter winding the two together to form a roll and storing the rolls thus obtained under air-and-moisture-proof conditions. The polyolefin separating sheet material may be mat-surfaced. The rolls obtained are preferably protected against access of moisture and air by suitable packing materials. The moisture content of the butyraldehyde sheet material thus remains unaffected by any washing process in the course of manufacture. The indispensable delicate mat texture of the surface of the polyvinyl butyraldehyde sheet material remains surprisingly unaffected in the process of the invention.

Sheet materials prepared from low-pressure polyethylene, pressure polyethylene or polypropylene can be used as the polyolefin separating sheet materials. For reasons of cost, very slight thicknesses, on the order of about 20 to 50 microns, for example, are to be preferred in connection with the separating material.

The optimum moisture content in the butyraldehyde sheet materials is on the order of approximately 0.4 to 1%, and preferably is from 0.5 to 0.8%, by weight. It can be adjusted more easily when the material is being manufactured than it can by the fabricator by means of air conditioning following the washing process. It will suffice to add the proper amount of water to the raw materials when the butyraldehyde sheets are being manufactured in the extruding machine, or else water is added in a slight excess to the raw materials and this excess is removed by a brief, partial, controlled drying of the continuous butyraldehyde web, using therefor infrared radiators or the like during manufacture.

The recent attempts made to eliminate the disadvantages mentioned at the beginning of the application by delivering unpowdered polyvinyl butyraldehyde sheet material in the supercooled state in order to prevent sticking on the roll have not proved economically acceptable as, in this case, the safety glass manufacturer requires special cold storage rooms or boxes, i.e., further and additional expenses, which are eliminated in the process according to the present invention. Also, the manufacture of supercooled sheet material itself is difficult and expensive.

Literature: Deutsche Auslegeschrift 1,211,769; U.S. Pat. 2,202,160; British Pat. 511,419.

What is claimed is:
1. Process for the manufacture of plasticizer-contain- ing, mat-surface polyvinyl butyraldehyde sheet material suitable for direct use in the manufacture of laminated safety glass comprising applying a polyolefin foil separating sheet onto a mat-surface polyvinyl butyraldehyde sheet material having a moisture content of about 0.4 to 1% by weight, winding the two together into a roll and storing the thusly obtained roll under conditions ensuring the absence of air and moisture.

2. Process according to claim 1 wherein said polyvinyl butyraldehyde sheet material has a moisture content of about 0.5 to 0.8% by weight.

3. Process according to claim 1 wherein said polyolefin foil has a thickness of about 20 to 50 microns.

4. Process according to claim 1 wherein said polyolefin foil has a mat-surface.

5. The polyvinyl butyraldehyde sheet material produced by the process of claim 1.

References Cited

UNITED STATES PATENTS

| | | | |
|---|---|---|---|
| 2,113,764 | 7/1936 | Macht | 156—106 |
| 2,113,767 | 7/1936 | Paggi | 156—106 |
| 2,375,396 | 2/1942 | Watkins | 156—106 X |
| 2,378,619 | 6/1965 | Carswell | 156—106 X |
| 3,234,062 | 10/1961 | Morris | 156—106 X |
| 3,282,722 | 7/1963 | Hailstone | 156—106 X |
| 3,402,099 | 8/1965 | Christensen | 156—106 X |

BENJAMIN R. PADGETT, Primary Examiner

G. G. SOLYST, Assistant Examiner

U.S. Cl. X.R.

156—106